US012351726B2

(12) United States Patent
Guite et al.

(10) Patent No.: US 12,351,726 B2
(45) Date of Patent: Jul. 8, 2025

(54) THERMALLY CURABLE PRIMERS FOR DIGITAL PRINTING

(71) Applicant: SUN CHEMICAL CORPORATION, Parsippany, NJ (US)

(72) Inventors: Joanne Guite, Newhey Rochdale (GB); Harvey Harpham, Newhey Rochdale (GB)

(73) Assignee: Sun Chemical B.V., Weesp (NL)

( * ) Notice: Subject to any disclaimer, the term of this patent is extended or adjusted under 35 U.S.C. 154(b) by 0 days.

(21) Appl. No.: 18/565,052

(22) PCT Filed: Oct. 7, 2022

(86) PCT No.: PCT/GB2022/052553
§ 371 (c)(1),
(2) Date: Nov. 28, 2023

(87) PCT Pub. No.: WO2023/057775
PCT Pub. Date: Apr. 13, 2023

(65) Prior Publication Data
US 2024/0254359 A1    Aug. 1, 2024

Related U.S. Application Data

(60) Provisional application No. 63/253,184, filed on Oct. 7, 2021.

(51) Int. Cl.
| C09D 11/54 | (2014.01) |
| B32B 27/08 | (2006.01) |
| B32B 27/30 | (2006.01) |
| B32B 37/06 | (2006.01) |
| B32B 38/00 | (2006.01) |
| B41M 3/00 | (2006.01) |
| B41M 5/00 | (2006.01) |
| B41M 7/00 | (2006.01) |
| C08J 7/04 | (2020.01) |
| C08J 7/043 | (2020.01) |
| C09D 11/023 | (2014.01) |
| C09D 11/037 | (2014.01) |
| C09D 11/102 | (2014.01) |
| C09D 11/107 | (2014.01) |

(52) U.S. Cl.
CPC ............ *C09D 11/54* (2013.01); *B32B 27/08* (2013.01); *B32B 27/304* (2013.01); *B32B 37/06* (2013.01); *B32B 38/145* (2013.01); *B41M 3/008* (2013.01); *B41M 5/0064* (2013.01); *B41M 7/009* (2013.01); *C08J 7/042* (2013.01); *C08J 7/043* (2020.01); *C09D 11/023* (2013.01); *C09D 11/037* (2013.01); *C09D 11/102* (2013.01); *C09D 11/107* (2013.01); *B32B 2250/246* (2013.01); *B32B 2255/10* (2013.01); *B32B 2255/26* (2013.01); *B32B 2255/28* (2013.01); *B32B 2309/02* (2013.01); *B32B 2327/06* (2013.01); *B32B 2425/00* (2013.01); *C08J 2423/08* (2013.01); *C08J 2433/02* (2013.01); *C08J 2475/04* (2013.01)

(58) Field of Classification Search
CPC ..... C09D 11/54; C09D 11/023; C09D 11/037; C09D 11/102; C09D 11/107; B32B 27/08; B32B 27/304; B32B 37/06; B32B 38/145; B32B 2250/246; B32B 2255/10; B32B 2255/26; B32B 2255/28; B32B 2309/02; B32B 2327/06; B32B 2425/00; B41M 3/008; B41M 5/0064; B41M 7/009; C08J 7/042; C08J 7/043; C08J 2423/08; C08J 2433/02; C08J 2475/04
See application file for complete search history.

(56) References Cited

U.S. PATENT DOCUMENTS

| 4,794,651 | A | 12/1988 | Landa |
| 5,407,771 | A | 4/1995 | Landa |
| 6,761,940 | B2 | 7/2004 | Kammerer |
| 7,470,736 | B2 | 12/2008 | Cooper |
| 9,639,011 | B2 | 5/2017 | Ron |
| 10,301,478 | B2 | 5/2019 | Seshadri |
| 10,564,562 | B2 | 2/2020 | Ron |
| 10,851,262 | B2 | 12/2020 | Crombie |
| 11,066,781 | B2 | 7/2021 | Chen |
| 2003/0103129 | A1* | 6/2003 | Tanaka ............... C09D 11/30 347/105 |
| 2006/0275671 | A1* | 12/2006 | Eto ............... B42D 25/328 430/1 |
| 2018/0163086 | A1* | 6/2018 | Crombie ............. C09D 11/102 |
| 2019/0367769 | A1* | 12/2019 | Zha ............... C09D 175/04 |

FOREIGN PATENT DOCUMENTS

| CN | 111 117 380 A | | 5/2020 |
| JP | 2019172753 A | * | 10/2019 |
| WO | WO 2020/190723 | | 9/2020 |
| WO | WO 2021/011606 | | 1/2021 |

OTHER PUBLICATIONS

Wicks et al., "Blocked Isocyanates III: Part A. Mechanisms and chemistry", Progress in Organic Coatings, vol. 36, issue 3, pp. 148-172, Aug. 1999, https://www.sciencedirect.com/science/article/pii/S0300944099000429. (Year: 1999).*
Communication Pursuant to Article 94 (3) EPC issued in counterpart application No. 22 801 868.5, mailed Feb. 16, 2024.
International Search Report issued in International Application No. PCT/GB2022/052553, mailed Dec. 20, 2022.
Written Opinion of the International Searching Authority issued in International Application No. PCT/GB2022/052553, mailed Dec. 20, 2022.

(Continued)

*Primary Examiner* — Christopher W Raimund
(74) *Attorney, Agent, or Firm* — Marian E. Fundytus; Amster Rothstein & Ebenstein LLP

(57) ABSTRACT

Aqueous print receptive primers comprising a crosslinking agent which are cured at temperatures above 80° C. after being overprinted via electrographic (toner) or inkjet digital printing processes.

4 Claims, No Drawings

(56) References Cited

OTHER PUBLICATIONS

International Preliminary Report on Patentability (Chapter 1 of the Patent Cooperation Treaty) issued in International Application No. PCT/GB2022/052553, mailed Aug. 14, 2023.

* cited by examiner

THERMALLY CURABLE PRIMERS FOR DIGITAL PRINTING

CROSS REFERENCE TO RELATED APPLICATIONS

The present application is a § 371 National Phase application based on PCT/GB2022/052553, filed 7 Oct. 2022, which claims the benefit of U.S. Provisional Application No. 63/253,184, filed 7 Oct. 2021 the subject matter of each of which is incorporated by reference in their entirety.

The present invention provides an aqueous primer coating composition suitable for use in digital printing of plastic substrates.

U.S. Pat. No. 11,066,781 (Eastern Tech) refers to a textile pretreatment for inkjet printing comprising greater than 40% (w/w) of a multivalent salt combined with up to 5% (w/w) of a blocked isocyanate and up to 40% (w/w) of an aqueous binder, which may be a polyurethane dispersion ('PUD'). Such high concentrations of metal salts make these primers unsuitable for the lamination process of the invention and furthermore, printing via digital electrophotographic printing, such as that of HP Indigo is not revealed.

U.S. Pat. No. 6,761,940 (Hueck Folien), without providing any illustrative examples, refers to a primer comprising a thermoplastic polymer which may further comprise a crosslinker. The thermoplastic polymer of the primer is preferably a copolymer of ethylene with an acrylate monomer. Reference to printing via the HP Indigo electrophotographic digital process is made. U.S. Pat. No. 6,761,940 does not refer to the use of a PUD along with a blocked isocyanate crosslinker according to the present invention.

The HP Indigo process uses what are termed 'Electroinks', which are essentially pigment dispersions in a carrier comprising paraffinic solvents and an ethylene copolymer (with comonomers selected from methacrylic acid and acrylic acid). They tend to have deficient adhesion to plastic substrates and poor heat resistance. The thermoplastic nature of the ethylene copolymer binder can result in a distortion of the print with a consequent loss in print quality. The present invention helps overcome these issues; namely poor adhesion and poor lamination bond strengths along with maintaining print quality during high temperature processing of such prints, including the thermal lamination process encompassed by the invention.

The inks used in the HP Indigo process (commonly referred to in the art as liquid toner inks) incorporate thermoplastic polymers, such as copolymers of ethylene with methacrylic acid or acrylic acid. A number of primers encompassing such copolymers for the subsequent printing with liquid toners via electrophotographic printing have been referred to in the prior art. U.S. Pat. No. 7,470,736 (Michelman) and WO 2020/190723 (Sun Chemical) refer to aqueous primer compositions comprising copolymers of ethylene and acrylic acid (or methacrylic acid) along with a polyurethane dispersion. Although suitable as print receptive primers for digital printing, without the additional crosslinker they will not maintain the print quality and enable good lamination bond strengths during thermal lamination.

U.S. Pat. No. 9,639,011 (HP) refers to a solvent-based primer for electrophotographic digital printing comprising a copolymer of ethylene and methacrylic or acrylic acid. This primer was applied via electrophotographic printing prior to printing with pigmented liquid toners ('HP Electrink'). The issues of adhesion, print quality maintenance during thermal lamination and the delivery of good thermal bond strengths were not discussed.

U.S. Pat. No. 10,564,562 (HP) takes this concept further through the application of an analog first-down aqueous primer, 'Digiprime 050', ex. Michelman, prior to a digitally applied primer along the lines disclosed in U.S. Pat. No. 9,639,011.

U.S. Pat. No. 10,851,262 (Sun Chemical) refers to an analog applied primer for digital printing, especially liquid electrophotographic digital printing ('LEP'). The primer, which comprises a blend of a polyurethane dispersion along with a self-crosslinking acrylic dispersion improves the adhesion and block resistance of prints to a range of substrates.

U.S. Pat. No. 10,301,478 (Ashland) refers to a primer coating, especially for LEP printing, comprising a cationic polyurethane dispersion along with either a polyoxazoline or N-vinyl pyrrolidone copolymer. The use of any crosslinker is not disclosed.

WO 2021/011606 (Michelman) refers to an aqueous primer coating comprising a multivalent metal salt and an amine-containing polymer suitable for digital printing via electrophotographic and inkjet processes. Although the possibility of including a crosslinker is mentioned, no disclosure around a thermally activated crosslinker such as a blocked isocyanate is made, nor a thermal lamination process according to the present invention.

The use of digital printing techniques, such as powder and liquid electrophotographic printing and inkjet printing has grown significantly over recent years. Digital printing is now penetrating into many of the markets traditionally served by analog printing processes (flexo, gravure, offset, screen printing, etc.). These markets include, for example graphics, packaging, corrugated, textiles, ceramics, commercial printing, etc.

Some of the benefits associated with digital printing include on-demand printing, personalization, variable data printing, reduction of stored printed stock.

The Hewlett-Packard Company's 'HP Indigo' liquid electrophotographic printing process has been successfully commercially implemented in a wide range of printing applications, including the printing of labels and narrow web packaging. In this process, the liquid toner images are formed on a photosensitive drum and electrostatically transferred onto a heated intermediate blanket prior to printing on a web or sheet substrates. Descriptions of this technology are provided in U.S. Pat. Nos. 4,794,651 and 5,407,771. Such liquid toners produce prints often deficient in adhesion to plastic substrates in particular and can also lack physical robustness, therefore requiring the use of protective overprint lacquers in some applications. Furthermore, and an issue addressed by the current invention, the prints produced by such liquid electrophotographic printing may not produce laminates with sufficient bonding strength to allow the laminates to meet the technical requirements.

Citation or identification of any document in this application is not an admission that such represents prior art to the present invention.

DETAILED DESCRIPTION

The current invention provides a solution to producing plastic laminates printed using liquid electrophotographic toners which are subsequently thermally laminated to second or further plastic plies. The invention is preferably directed towards the printing of the plastic cores of payment and financial cards followed by the thermal lamination of the printed surface with further plastic layers. Most particularly, the invention is directed towards the printing of vinyl chloride or vinylidene dichloride homopolymers and copolymers containing banking card cores, prior to the thermal lamination of further plastic plies which may also comprise vinyl chloride or vinylidene dichloride homopolymers and copolymers. By thermal lamination this is the process where a second plastic film is brought into contact with the printed surface of the card core and then subjected to high temperatures (typically in excess of 100° C., and more usually in excess of 120° C.) and pressure (typically in excess of 50 bar, and up to 200 bar) to form the bonded laminate. Without the primer of the invention not only do card cores printed with liquid electrophotographic fluids lack the necessary laminate bond strength they also are subject to a loss of print quality during thermal lamination. This loss of print quality results from the ink 'moving' during the thermal lamination. The inventors do not wish to be bound to any theory behind this loss of print quality but postulate that it is due, in part, to the thermoplastic nature of the polymer binder of toner which softens and deforms during lamination.

Primers prepared according to the present invention help overcome deficiencies related to adhesion and lamination bond strength along with maintenance of print quality. This is achieved through using a polyurethane dispersion as a polymer binder and a thermally activated blocked isocyanate crosslinker. Again, the inventors do not want to be bound by any theory but postulate that after printing, a part of the crosslinker migrates from the primer into the ink such that when the print is laminated both the primer and ink crosslink to maintain the print quality.

The prior art does not disclose the use of a thermally curable print receptive primer according to the present invention, especially for electrophotographic (toner) printing, in the manufacture of payment and financial cards. U.S. Pat. No. 11,066,781, refers to a primer rich in a cationic salt further comprising a blocked isocyanate and a polyurethane dispersion for the inkjet printing of textiles. However, the inventors have found that it is important for the thermal lamination production of payment and financial cards that the primer comprises predominantly of the thermoplastic polyurethane dispersion (i.e., the primer composition preferably comprises greater than 40% w/w of polyurethane dispersion) to provide adequate lamination bond strengths. In addition, the inventors have found that the high concentrations of cationic salt used in U.S. Pat. No. 11,066,781 are detrimental to both the print quality with electrophotographic printing and subsequent lamination bond strengths. A number of instances in the background references describe primers for electrophotographic printing comprising polyurethane dispersions, but without the essential crosslinker (blocked isocyanate) which is key to the process of the present invention.

Print receptive primers for digital printing and especially by electrophotographic printing having a crosslinking agent which is activated at temperatures in excess of 80° C. have not been disclosed. Without the thermally activated crosslinker there is a loss in print quality during the thermal lamination to form finished payment and financial cards and also the incorporation of the crosslinking agent results in significantly stronger laminate bond strengths than would be achieved without its use.

The benefits of printing onto a thermoplastic primer to ensure good print receptivity followed by a curing reaction activated by the high temperatures of thermal lamination to ensure print quality maintenance during that lamination and good laminate bond strengths has not been disclosed in the prior art.

The present invention relates to an aqueous primer coating composition comprising a polyurethane dispersion and a thermally activated blocked isocyanate crosslinking agent. Preferably, the aqueous primer coating composition (also referred to as a print receptive primer) is applied to a substrate via flexography, gravure or screen printing. The primer can then be overprinted with one or more digital inks. Preferably, overprinting is via digital electrophotographic (toner) printing.

Although preferably directed towards aqueous print receptive primers for overprinting via digital electrophotographic (toner) printing the primers of the invention are also suitable for overprinting via inkjet printing and especially for aqueous inkjet printing inks (i.e., overprinting with aqueous inkjet printing inks via inkjet printing).

The aqueous print receptive primers comprising a crosslinking agent according to the present invention are suitable for curing at temperatures above 80° C. after being overprinted via electrographic (toner) or inkjet digital printing processes. The primers are preferably applied by flexography, gravure or screenprinting methods. In a preferred process, the primers are used in the manufacture of payment and financial cards (such as credit cards, bank cards and the like) where the primer is applied to the core of the card, digitally printed on, then thermally laminated to second and possibly further plastic plies. The primers of the present invention comprise aqueous polyurethane dispersions where the crosslinking agent is a thermally activated blocked isocyanate. For the manufacture of payment and financial cards the primers of the invention ensure that print quality is maintained during the thermal lamination process and also ensure that the bonding strength between the primed and digitally printed core and the succeeding plastic layers of the final card are in excess of 7N after being aged for 2 weeks at 55° C. and 93% relative humidity. The bond strengths can be measured using a JJ Lloyd bond strength tester.

This is achieved by using aqueous primer coating compositions comprising a thermoplastic polyurethane dispersion along with a crosslinking agent. The crosslinking agent, which is a blocked isocyanate, is only active at temperatures in excess of 80° C. Thus, the inventive primer is deemed useful, especially, for electrophotographic (toner) printing a thermoplastic print receptive. After printing the primer becomes crosslinked during the thermal lamination to form the finished card. It is conceivable that some of the crosslinker in the primer migrates into the ink so that both become crosslinked during lamination. Without the crosslinker there is a loss in print quality and the laminate bond strengths are significantly weaker than is achieved with its inclusion.

The inventive primers allow the manufacture of digitally printed payment and financial cards (and also identity cards). This is highly beneficial allowing for the advantages associated with digital printing, such as variable data, personalization, on-demand printing and even the printing of individual security features to be realized. The inventors have shown that it is the use of the thermally activated cure of the primers which is key in ensuring that print quality is maintained, and good laminate bond strengths are achieved when the primed and printed core of the card is thermally laminated to further plastic plies at temperatures in excess of 100° C.

These significant advantages conferred by the invention allow for the digital printing production of payment and financial cards which is not currently possible.

Furthermore, the invention enables a market desired shift from analog to digital printing of such cards.

The primer is applied first to the plastic card core, dried and then printed digitally to produce the desired image and information before the printed core is thermally laminated to further plastic layers and subjected to any other production processes such as the inclusion of holograms and the like.

After the substrate (e.g. card core) card is coated with the inventive primer it may be subsequently overprinted by any digital process including liquid electrographic (toner) printing, dry electrographic (toner) printing and inkjet printing. For inkjet printing the invention is especially suited to the printing with aqueous inkjet printing inks but also allows for the printing with UV-, and energy-curable inkjet printing inks and solvent-based inkjet printing inks. However, the invention is especially suited to liquid electrographic (toner) printing, such as Hewlett Packard's 'HP Indigo' process.

The film weight of the primer coating applied to the first substrate of the invention, after drying, is preferably in the range 0.1 to 10.0 g m$^{-2}$, more preferably 0.1 to 5.0 g m$^{-2}$, and most preferably 0.2 to 5.0 g m$^{-2}$.

The inventive primer coating comprises as key elements a polyurethane dispersion and a thermally activated blocked isocyanate crosslinking reagent. The crosslinking reagent is a blocked isocyanate which is activated at temperatures in excess of 80° C. to cause the unblocking of this crosslinker thereby releasing the isocyanate groups which can induce the crosslinking of the primer-print combination. The polyurethane (which is a water-dispersible polymer) should preferably form, on dry weight, between 2.5 and 99.9% (w/w) of the primer coating composition; more preferably between 10.0 and 98%; and most preferably between 20.0 and 95.0%. The crosslinker should preferably form, on dry weight, between 0.1 and 25.0% of the primer coating compositions; more preferably between 0.5 and 20.0%.

Preferably, the inventive primer coating composition comprises greater than 40% (w/w) of the polyurethane dispersion, more preferably greater than 50% (w/w), even more preferably greater than 60% (w/w). Preferably, the inventive primer composition comprises 45-95% (w/w) of the polyurethane dispersion, more preferably 55-90% (w/w), even more preferably 60-85% (w/w).

There is no restriction on the nature of the PUD used to prepare the aqueous primers of the invention. Anionic, cationic and non-ionically stabilized PUDs are encompassed by the invention as are aromatic and aliphatic PUDs. Preferably, the polyurethane dispersion is an anionic polyurethane dispersion.

There are a variety of commercially available PUDs that can be used in the invention including those sold under the trademarks Neorez (DSM), Bayhydrol (Covestro), Sancure (Lubrizol), Syntegra (Dow), Luplen (BASF), Beetafin (BIP), Daotan (Allnex), and those supplied under the 'U' nomenclature from Alberdingk-Boley.

Without going into detail of their manufacture, the invention also encompasses aromatic and aliphatic PUDs and further encompasses PUDs produced from polyether diols, polyester diols, polyacrylic diols and polycarbonate diols or any blend or hybrid thereof. As previously stated, the PUDs may be anionic, cationic or non-ionic in terms of their stabilization, or a combination of any of the aforementioned stabilization mechanisms. Anionic PUDs are especially preferred and are commonly produced by the inclusion of a carboxylic acid into the polymer structure of the PUD for example by the urethane reaction of dimethylol propionic acid ('DMPA'). Where DMPA, or other acid-containing species, is incorporated into the PUD backbone then it may be neutralized with any organic or inorganic base to provide the anionic stabilizing mechanism. These various resin types may, where applicable, be neutralized using organic bases, including, but not limited to, ammonia, triethanolamine, triisopropanolamine, dimethyl aminoethanol, N-methyldiethanolamine or arginine. Alternatively, they may be neutralised by an inorganic base including (but not limited to) alkali metal oxides, alkali metal hydroxides or alkali metal carbonates, with sodium hydroxide or potassium hydroxide being the preferred inorganic bases.

The primers of the invention may comprise more than one polyurethane dispersion. For example, the primer composition of the invention may comprise a first polyurethane dispersion and a second polyurethane dispersion.

The primers of the invention may also optionally further comprise an additional polymer dispersion other than a polyurethane dispersion selected from acrylic, epoxy and/or polyester dispersions.

For example, the aqueous primers of the invention may also optionally further comprise any styrene-acrylic dispersion. Suitable styrene-(meth)acrylic resin dispersions are widely available commercially and include those sold under the trade names Joncryl (BASF), Revacryl (Synthomer), Hycar (Lubrizol), Neocryl (DSM), Neboplast (Necarbo), and the Picassian AC range (Picassian Polymers). It should be understood that this is not a limiting list and those skilled in the art should appreciate that any other styrene-(meth)acrylic resin dispersion could be used.

Alternatively, the aqueous primers of the invention may also further comprise any solution polymer (also referred to as an alkali-soluble polymer) including alkali-soluble acrylic and styrene-acrylic polymers. As will be understood, an alkali-soluble polymer typically refers to a polymer usually comprising acid moieties as part of the monomer blend, which can be neutralized with a suitable base including but not limited to ammonia, amines (e.g. triethylamine or triethanolamine) or inorganic bases (e.g. NaOH, KOH) to form polymers that can be dissolved in water to form an aqueous solution. Where alkali-soluble acrylic or styrene-acrylic polymers are used they include those that comprise any of acrylic acid, methacrylic acid, maleic anhydride, itaconic acid, along with any blend of ethylenic, acrylic or methacrylic monomers including (but not limited to) styrene, methyl methacrylate, butyl acrylate, butyl methacrylate, ethyl acrylate, ethyl methacrylate, ethylhexyl acrylate, ethylhexyl methacrylate. Aqueous solutions of these acrylic polymers are formed by neutralising the carboxylic acid groups of the polymer with any base, including (but not limited to) ammonia, trimethylamine, triethanolamine, sodium hydroxide, potassium hydroxide, whilst dissolving the polymer in water.

The primer of the invention may preferably comprise a polyurethane dispersion and an acrylic copolymer such as an ethylene acrylic acid copolymer.

The primer composition according to the present invention includes water. This would preferably not contain ionic impurities and is therefore preferably ion exchanged or distilled water. The quantity of water used according to the present invention, including that which is supplied as part of the raw materials used, is preferably 20 to 80%, more preferably 30 to 70% by mass according to the entire ink composition.

The primers may also optionally include any co-solvent, including but not limited to; ethanol, propanol, butanol, acetone, propylene glycol, glycerol, glycol ethers.

The primers may also comprise any number of additives including (but not limited to) surfactants, wetting aids, antifoams, de-aerators, biocides. Suitable additives are described herein, but it should be understood that the invention is not limited to those additives.

The primers may also optionally comprise any dispersion of an inorganic material, including (but not limited) to silica, alumina and clay.

The primers may preferably have solid contents of between 5.0 and 60.0% (w/w) and more preferably between 5.0 and 40.0% (w/w).

The thermally activated crosslinker used in the primers of the invention is a blocked isocyanate. Blocked isocyanates are a class of crosslinker where the reactive isocyanate groups of the crosslinker have been reacted with a suitable blocking agent. Hence, thermally activated blocked isocyanate crosslinking agents are blocked isocyanates that can be unblocked (i.e., activated) upon heating, for example at temperatures of greater than 80° C. Typically, the thermally activated blocked isocyanate crosslinking agents used in the present invention are unblocked (i.e., activated) at 90 to 200° C., preferably 100 to 180° C.

Examples of blocking agents along with their typical unblocking temperatures are diethyl malonate ('DEM'; 100 to 120)° C., 3,5-dimethylpyrazole ('DMP'; 110 to 120)° C., methylethylketoxime ('MEKO'; 140 to 160)° C. and caprolactam (160 to 180° C.). Such blocked isocyanates, which may be difunctional, trifunctional, tetrafunctional or higher functional with respect to the number of isocyanate groups per molecule, allow the preparation of stable one-pack crosslinkable compositions and are used in a number of applications, including automotive coatings and textiles inks. The blocked isocyanate crosslinkers used in the preparation of the primers of the invention are preferably water-based. Trixene BI220 (ex. Lanxess) (a water-based dispersion) was used in the preparation of the examples. The blocking group used in the preparation of Trixene BI220 is DMP, and as such allows unblocking at temperatures typical of those used in the thermal lamination production of payment and financial cards, such as 120 to 160° C. Blocked isocyanates are available from a number of suppliers including Lanxess ('Trixene'), Covestro ('Imprafix'), Aquaspersions ('Aqualink'), Rudolf GmbH ('Rucopud'). Additionally, blocked isocyanates from Evonik can be used (for example Vestanat.

Preferably, the blocked isocyanate crosslinking agent is an aqueous dispersion.

Preferably, the primer compositions according to the present invention comprise 1-5% (w/w) of the blocked isocyanate dispersion, more preferably 2-4% (w/w) of the blocked isocyanate dispersion.

The primers may be suitable for application by any suitable printing or coating method including, but not restricted to flexographic printing, gravure printing, screen printing, roller coating, spray coating. Flexographic and screen printing are preferred deposition methods.

The primer according to the present invention may optionally further comprise a multivalent metal salt. If a multivalent metal salt is present, it is preferably present in less than 20% (w/w), more preferable less than 10% (w/w), even more preferably less than 5% (w/w). Suitable multivalent metal salts include (but are not limited to) multivalent cationic salts such as calcium nitrate (and hydrates thereof), calcium ammonium nitrate, calcium acetate and calcium chloride. Preferably, the primer according to the present invention comprises less than 20% (w/w) of calcium nitrate (and hydrates thereof), calcium ammonium nitrate, calcium acetate or calcium chloride, more preferable less than 10% (w/w) of calcium nitrate (and hydrates thereof), calcium ammonium nitrate, calcium acetate or calcium chloride, even more preferably less than 5% (w/w) of calcium nitrate (and hydrates thereof), calcium ammonium nitrate or calcium chloride.

Alternatively, the primer according to the present invention is substantially free of a multivalent metal salt, i.e., the primer comprises less than 1% (w/w) of a multivalent metal salt. Thus, in alternate preferred aspects of the invention, the primer comprises less than 1% (w/w) of calcium nitrate (and hydrates thereof), calcium ammonium nitrate, calcium acetate or calcium chloride.

The primers may optionally further comprise a crosslinker in addition to the thermally activated blocked isocyanate crosslinker, which may be selected from the following non-limiting examples; polycarbodiimides (for example, Carbodilite, ex. Nisshinbo), oxazoline-functional polymer crosslinkers (e.g. Epocros, ex. Nippon Shokubai), melamine-formaldehydes (for example, Maprenal, ex. Ineos Melamines), epoxies (for example Polycup, ex. Solenis), zinc ammonium carbonate solutions, zinc oxide nanoparticles (for example Oxylink, ex. Buhler). Where present, the composition comprises 0.1-5 wt % (w/w) of the additional crosslinker. For instance, the composition may comprise 0.1-5% (w/w) of a polycarbodiimide crosslinker.

Since primers of the current invention are primarily water-based in nature, it is also preferable to include a biocide or anti-mold agent. Suitable examples include products based on the following biocide structural types: benz-isothiazolinone, bromo-nitro-propane-diol, isothiazolinone, ethylenedioxydimethanol, or iodo-propynyl butyl carbamate, which are marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the primer composition.

Defoamers can also optionally be included in the formulation; these prevent the formation of foam during manufacture of the primer and also while printing. Defoamers are particularly important with recirculating printheads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives may optionally be used to control the surface tension of the primer to give the desired spread and wetting on the substrate. They can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont. Also suitable for use are the non-ionic Hydropalat range from BASF.

Included in the primer can optionally be a suitable de-aerator to prevent the formation of air inclusions and pinholes in the dried coating which could affect the primer's performance. Examples include the following products available from Evonik: TEGO AIREX 900, 910, 916, 920, 931, 936, 940, 944, 945, 950, 962, 980 and 986.

The aqueous primer of the invention is preferably colorless. Alternatively, the primer may also be a pigmented composition.

As described above, although the primers of the invention are most preferably colorless, they may, where required, optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are milled to typically less than 1 micrometer after milling with a preferred particle size distribution of 10-500 nm, more preferably 10-350 nm to have better transparency and a wide color gamut.

In order to incorporate the above-described pigments into the inventive compositions, it is preferable that the pigments are manufactured and stably stored as a pigment concentrate in water. This is typically achieved by dispersing the pigment into a water-soluble or water-dispersible resin using a water-soluble and/or a water-dispersible surfactant which introduces hydrophilic functional groups into the surface of the pigment particles. Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. Examples of the salts include sodium hydroxide, potassium hydroxide and salts of basic compounds such as ammonia, ethylamine, diethanolamine, triethanolamine, propylamine, isopropylamine, dipropylamine, butylamine, isobutyl amine, diethanolamine, triethanolamine, triisopropanolamine, dimethyl ethanolamine, amino methyl propanol, and morpholine. The amount of the basic compound is not strictly limited as long as the resin dispersant is equal to or more than the neutralization equivalent.

Examples of surfactants used for preparing the pigment dispersion include anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

The primers of the invention are suitable for applying to plastic substrates (e.g., plastic cards). Suitable plastic substrates (e.g., plastic cards) include those made from polyvinyl chloride acetate, polyvinyl chloride, polyvinylidene dichloride, or any blend of these polymers or copolymers thereof. The substrate is preferably polyvinyl chloride. Preferably, the substrate is a plastic card. Plastic cards are suitably made from polyvinyl chloride acetate, polyvinyl chloride, polyvinylidene dichloride, or any blend of these polymers or copolymers thereof. Accordingly, the substrate is preferably a plastic card made from polyvinyl chloride acetate, polyvinyl chloride, polyvinylidene dichloride, or any blend of these polymers or copolymers thereof.

The primers of the invention are preferably applied to the plastic core of a card (preferably a payment card). The primers of the invention are applied to the plastic core of the card by any suitable printing or coating method, most preferably by either flexographic or screen printing. The cores of payment cards are typically made from polyvinyl chloride acetate, polyvinyl chloride, polyvinylidene dichloride, or any blend of these polymers or copolymers thereof. However, it should be understood that the primer is suitable for coating any plastic core used in the manufacture of payment and financial cards.

Once the substrate (e.g., card core) has been coated with the primers of the invention, they are then printed via any digital printing process as previously outlined. However, printing the primed cored via a liquid electrophotographic process, such as Hewlett Packard's 'Indigo' is preferred.

The printed primed core is then thermally laminated to further plastic layers, which may be the same polymer type or a different polymer to the core. This is a process well known to those skilled in the art and typically involves bringing the laminating plastic layers into contact with the printed core and subjecting the plastic layers to temperatures typically between 120 and 160° C., under pressure, although lower and higher temperatures can be used. Pressures typically in excess of 5 psi, and more typically in excess of 10 psi are used. The thermal lamination typically takes anywhere from 0.1 seconds up to 30 minutes.

Without the primer according to the invention, the inventors have found that cards produced via Indigo printing not only are deficient in lamination bond strengths, but there is also a loss of print quality. This loss of print quality is referred to 'ink movement' and it may result from the thermoplastic polymers contained in the Indigo 'Electroink' undergoing a degree of melt flow during lamination. The primer, with its heat activated crosslinker, maintains print quality by reducing the degree of 'ink movement', as well as helping to deliver lamination bond strengths preferably in excess of 7N/cm, and more preferably 15 N/cm or greater for the final card structure.

Definitions

Particle size/average particle size—the terms "particle size" or "average particle size" refer to the volume distributed median particle diameter (equivalent spherical diameter corresponding to 50% of the volume of all the particles, read on the cumulative distribution curve relating volume % to the diameter of the particles—often referred to as the "D(v, 0.5)" value). Particle size is preferably measured by laser light diffraction.

Unless stated otherwise, the term nanoparticle refers to a particle having one dimension of less than 100 nm.

Unless stated otherwise, lamination bond strengths were measured using a JJ Lloyd tensiometer via a T-peel test at room temperature (23)° ° C. and at a separation speed of 300 mm/min. The lamination bond strengths are reported as N/cm; that is the force required to separate the top film from the primed and printed core for a 1 cm wide strip, e.g., lamination bond strengths reported as N/25 cm is the force required to separate the top film from the primed and printed core for a 25 cm wide strip.

Unless stated otherwise, viscosity was measured with a Brookfield CAP200 viscometer, equipped with Spindle No. 4, at 50 rpm and a temperature of 19.1° C.

The invention is further described by the following numbered paragraphs:

1. An aqueous primer coating composition comprising a polyurethane dispersion and a thermally activated blocked isocyanate crosslinking agent.
2. The coating composition according to paragraph 1, wherein the polyurethane dispersion forms greater than 40% (w/w) of the total composition.
3. The coating composition according to paragraph 1 or 2, wherein the blocked isocyanate is water-based and the blocking agent is selected from the group consisting of diethyl malonate, 3,5-dimethylpyrazole, methylethylketoxime, caprolactam and blends thereof.
4. The coating composition according to any preceding paragraph, comprising 1-5% (w/w) of a blocked isocyanate.
5. The coating composition according to any preceding paragraph, further comprising a multivalent metal salt.
6. The coating composition according to any preceding paragraph, further comprising one or more additional thermally activated crosslinkers selected from the group consisting of polycarbodiimides, oxazoline-functional polymer crosslinkers, melamine-formaldehydes, epoxies, zinc ammonium carbonate solutions and nano zinc oxide.
7. A method of providing a primed substrate, comprising applying the primer of any one or more of paragraphs 1-6 and drying the primer.
8. The method of paragraph 7, wherein the substrate is a plastic card.
9. A method of providing a primed and printed substrate, comprising applying the primer of any one or more of paragraphs 1-6 and drying the primer, and subsequently printing one or more inks over the top of the primer and drying the subsequent one or more inks.
10. The method of paragraph 9, wherein the substrate is a plastic card.
11. The method of any one or more of paragraphs 7-10, wherein the primer is applied to a core plastic layer and subsequently digitally printed, and finally subjected to thermal lamination to further plastic layers.
12. The method of paragraph 11, wherein the thermal lamination of further plastic layers is conducted at ≥100° C.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Preparation of Flexo and Screen Primers According to the Invention

Primer coatings were prepared according to the formulations laid out in Tables 1 and 2. The components were added in sequence with the polyurethane dispersion first and blended with a Dispermat high shear mixer.

TABLE 1

Payment Card Core Primer Compositions

| Component | Inv. Ex. 1 (Flexo) (wt. %) | Inv. Ex. 2 (Screen) (wt. %) | Inv. Ex. 3 (Flexo) (wt. %) | Inv. Ex. 4 (Flexo) (wt. %) |
|---|---|---|---|---|
| Polyurethane dispersion[1] | 73.09 | 72.95 | 75.40 | 69.40 |
| Aquaseal 2077[2] | 22.37 | 22.33 | — | — |
| COHESA X-3060[3] | — | — | 19.10 | 19.10 |
| Tego Foamex 1488[4] | 0.10 | 0.10 | 0.10 | 0.10 |
| Acticide WR-0268[5a] | 0.23 | 0.23 | — | — |
| Acticide PHE[5b] | — | — | 0.10 | 0.10 |
| Surfynol 440[6] | 0.49 | 0.49 | 0.50 | 0.50 |
| Urea | 0.97 | 0.97 | — | — |
| Additol VXW 6388[7] | 0.32 | 0.50 | 0.30 | 0.30 |
| Trixene BI220[8] | 2.43 | 2.43 | 2.40 | 2.40 |
| Carbodilite SV-02[9] | — | — | 2.00 | — |
| Tego Variplus DS50[10] | — | — | — | 8.00 |
| Water | — | — | 0.10 | 0.10 |
| Total | 100 | 100 | 100 | 100 |
| Viscosity | 1.76 poise | 3.72 poise | 2.0 poise | 1.75 poise |

[1]Anionic polyurethane dispersion, ex. Alberdingk-Boley (28% solids);
[2]Formulated Water-based polymer dispersion, ex. Paramelt (33% solids);
[3]Oil-in-water emulsion of an ethylene acrylic acid copolymer (Honeywell; 44.5% solids);
[4]Defoamer, ex. Evonik;
[5a, 5b]Biocide, ex. Thor ([5a]35% solids, [5b]50% solids);
[6]Surfactant/wetting aid, ex. Evonik;
[7]Polyurethane thickener, ex. Allnex (37.5% solids);
[8]Blocked isocyanate dispersion (41% solids content), ex. Lanxess;
[9]Carbodiimide cross linker, ex. Nisshinbo (40% solids),
[10]Anionic dispersion of PU polyol, ex. Evonik (33% solids).

TABLE 2

Payment Card Core Primer Comparative Compositions

| Component | Comp. Ex. 1 (wt. %) | Comp. Ex. 2 (wt. %) | Comp. Ex. 3 (wt. %) | Comp. Ex. 4 (wt. %) |
|---|---|---|---|---|
| Polyurethane dispersion[1] | 75.52 | 10 | 20 | 30 |
| Aquaseal 2077[2] | 22.37 | 22.37 | 22.37 | 22.37 |
| Tego Foamex 1488[4] | 0.10 | 0.10 | 0.10 | 0.10 |
| Acticide WR-0268[5] | 0.23 | 0.23 | 0.23 | 0.23 |
| Surfynol 440[6] | 0.49 | 0.49 | 0.49 | 0.49 |
| Urea | 0.97 | 0.97 | 0.97 | 0.97 |
| Additol VXW 6388[7] | 0.32 | 0.32 | 0.32 | 0.32 |
| Trixene BI220[8] | — | 2.43 | 2.43 | 2.43 |
| Water | — | 63.09 | 53.09 | 43.09 |
| Total | 100 | 100 | 100 | 100 |
| Viscosity | 2.7 poise | — | — | — |

[11]Polyurethane dispersion (28% solids).

The viscosities, as measured with a Brookfield CAP200 viscometer, equipped with Spindle No. 4, at 50 rpm and at a temperature of 19.1° C., were 1.76 Poise and 3.72 Poise for Examples 1 and 2, respectively.

DESCRIPTION OF EXAMPLES

Inventive Example 1: Flexographic PUD primer formulation with blocked isocyanate dispersion crosslinker.

Inventive Example 2: Screen printing PUD primer formulation with blocked isocyanate dispersion crosslinker.

Comparative Example 1: Digital PUD primer (Sun Chemical) for flexible packaging applications with no additional crosslinker.

Inventive Example 3: PUD primer formulation with oil-in-water emulsion of an ethylene acrylic acid copolymer, blocked isocyanate dispersion crosslinker and carbodiimide crosslinker.

Inventive Example 4: PUD primer formulation with oil-in-water emulsion of an ethylene acrylic acid copolymer, blocked isocyanate dispersion crosslinker and anionic dispersion of PU polyol.

The primer compositions were applied at 12 gsm (wet) to a PVC based payment card core and then dried to achieve a dry film weight in the range 2.5 to 3.5 gsm (dry). The primed PVC cores were then printed with liquid electrophotographic inks via a HP Indigo Sheet fed press. The primed and printed cores were then thermally laminated under various conditions according to Table 3 to second flexible PVC films. The lamination bond strengths were measured using a JJ Lloyd tensiometer via a T-peel test at a separation speed of 300 mm/min; this is type of testing is well understood by those skilled in the art. The lamination bond strengths are reported as N/cm; that is the force required to separate the top PVC film from the primed and printed core for a 1 cm wide strip. Ideally, the minimum bond strength should be 9 N/cm, but preferably 10 N/cm or greater more preferably, 15 N/cm or greater, and even more preferably 20 N/cm or greater.

Adhesion was measured by a tape test using 3M Scotch magic tape. This is placed onto the surface of the printed substrate and rolled 5 times with a 2 kilo roller as per ASTM F2252/52252M-13(2018). The ink removal is then recorded as a %. All of the inventive examples passed the tape test showing that adhesion was good.

It was observed that without any primer, ink transfer to the vinyl card core was poor and that adhesion, as assessed by a tape test, was also poor. Furthermore, without any primer, 'ink movement' during the thermal lamination was observed.

TABLE 3

Lamination Results

| Primer | Lamination Temp. (° C.) | Lamination Pressure (psi) | Lamination Dwell Time (sec.) | Average Lamination Bond Strength (N/15 mm) | Average Lamination Bond Strength (N/25 mm) | Ink Movement? |
|---|---|---|---|---|---|---|
| None | 140 | 40 | 0.5 | <7.0 | | Yes |
| None | 140 | 40 | 20 | | <7.0 | — |
| Comp. Ex 1 | 140 | 40 | 0.2 | 12.7 | | No |
| Comp. Ex 1 | 140 | 40 | 0.5 | 16.2 | | No |
| Comp. Ex 1 | 140 | 40 | 1.0 | 21.3 | | No |
| Comp. Ex 1 | 140 | 20 | 0.5 | 12.0 | | No |
| Comp. Ex 1 | 140 | 20 | 1.0 | 19.2 | | No |
| Comp. Ex 1 | 140 | 40 | 20 | | 21.1 | — |
| Inv. Ex. 1 | 140 | 40 | 0.2 | 17.5 | | No |
| Inv. Ex. 1 | 140 | 40 | 0.5 | 24.6 | | No |
| Inv. Ex. 1 | 140 | 40 | 1.0 | 27.4 | | No |
| Inv. Ex. 1 | 140 | 20 | 0.5 | 24.7 | | No |
| Inv. Ex. 1 | 140 | 20 | 1.0 | 26.3 | | No |
| Inv. Ex. 1 | 140 | 40 | 20 | | 27.5 | — |
| Inv. Ex. 2 | 140 | 40 | 20 | | 22.8 | — |
| Inv. Ex. 3 | 140 | 40 | 20 | | 25.5 | — |
| Inv. Ex. 4 | 140 | 40 | 20 | | 23.8 | — |
| Comp. Ex. 2 | 140 | 40 | 20 | | 11.9 | — |
| Comp. Ex. 3 | 140 | 40 | 20 | | 15.9 | — |
| Comp, Ex. 4 | 140 | 40 | 20 | | 16.2 | — |

Note:
Inventive Examples 1 & 2 are very similar compositionally (Inventive Example 2 was a modified version of Example 2 such that it is suitable for screen printing). One of skill in the art would know that the two examples would perform very similarly in the lamination bond strength test. Thus, Inventive Example 2 was not tested for this property under all conditions.

The results in Table 2 show that a primer comprising the polyurethane dispersion without blocked isocyanate (Comparative Example 1) prevents any ink movement during the thermal lamination process. Including the blocked isocyanate (Inventive Example 1) produces a noticeable improvement in the lamination bond strength when compared at the same dwell time and pressure, a highly desirable feature of the invention. In addition, the inventive examples also prevent ink movement during the thermal lamination process. Thus, the invention examples exhibit improved lamination strength whilst maintaining print quality.

The invention claimed is:

1. A method for preparing a digitally printed laminate, comprising the steps of:
   a. applying an aqueous primer coating comprising a polyurethane dispersion and a thermally activated blocked isocyanate crosslinking agent, wherein the polyurethane dispersion forms greater than 40% (w/w) of the total composition and where the polyurethane forms, on dry weight, between 10.0 and 98% of the coating composition, onto a first substrate;
   b. drying the primer;
   c. overprinting the primed substrate with one or more digital ink(s);
   d. drying the one or more digital ink(s); and
   e. laminating a second substrate to the primed and printed first substrate at ≥80° C. to produce a laminated structure.

2. The method of claim 1, wherein the laminating is performed at ≥100° C.

3. A laminate structure prepared by the method of claim 1.

4. The laminate structure according to claim 3 which is a payment card.

* * * * *